(12) United States Patent
Francis et al.

(10) Patent No.: US 12,198,326 B2
(45) Date of Patent: Jan. 14, 2025

(54) CABLE PREPARATION INSPECTION DEVICE, SYSTEM AND METHOD

(71) Applicant: 3M INNOVATIVE PROPERTIES COMPANY, St. Paul, MN (US)

(72) Inventors: Cecil V. Francis, Cedar Park, TX (US); Sally M. Grambusch, Round Rock, TX (US); Robert A. Hale, Austin, TX (US); Qingqiang Ma, Shanghai (CN); Douglas B. Gundel, Cedar Park, TX (US); Huo Ying Lu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 592 days.

(21) Appl. No.: 17/593,977

(22) PCT Filed: Apr. 10, 2019

(86) PCT No.: PCT/CN2019/082006
§ 371 (c)(1),
(2) Date: Sep. 29, 2021

(87) PCT Pub. No.: WO2020/206627
PCT Pub. Date: Oct. 15, 2020

(65) Prior Publication Data
US 2022/0164940 A1    May 26, 2022

(51) Int. Cl.
*H04N 23/698* (2023.01)
*G06T 7/00* (2017.01)
(Continued)

(52) U.S. Cl.
CPC ........... *G06T 7/001* (2013.01); *H02G 1/1297* (2013.01); *H04N 23/695* (2023.01); *H04N 23/698* (2023.01)

(58) Field of Classification Search
CPC .... G06T 7/001; H04N 23/695; H04N 23/698; H02G 1/1297
(Continued)

(56) References Cited

U.S. PATENT DOCUMENTS 4,355,857 A * 10/1982 Hayward ........... H01R 13/2421
                                                    439/578
5,361,653 A    11/1994 Pradin
(Continued)

FOREIGN PATENT DOCUMENTS

CN         101132097        2/2008
CN         102072907        5/2011
(Continued)

OTHER PUBLICATIONS

International Search Report for PCT International Application No. PCT/CN2019/082006, mailed on Jan. 14, 2020, 4 pages.

*Primary Examiner* — Jayanti K Patel
*Assistant Examiner* — Richard B Carter
(74) *Attorney, Agent, or Firm* — Gregg H. Rosenblatt (57) ABSTRACT

A device for analyzing or inspecting a prepared portion of a power cable includes a cable gripping section to grip a portion of the power cable proximate to a prepared end of the power cable, where the cable end has been prepared by removing certain portions of the power cable so that it can properly accept an electrical or cable accessory, such as a splice or termination. The device also includes an imaging device holding section to hold an imaging device at a predetermined radial distance from the prepared cable end. In particular, the imaging device holding section is radially and axially adjustable in position. During inspection of the prepared cable end, the imaging device is fully rotated about the prepared cable end to acquire a 360 degree image of the prepared cable end.

6 Claims, 5 Drawing Sheets

(51) Int. Cl.
*H02G 1/12* (2006.01)
*H04N 23/695* (2023.01)

(58) Field of Classification Search
USPC .................. 348/37, 125; 702/158; 385/101; 439/578; 29/863
See application file for complete search history.

(56) References Cited

U.S. PATENT DOCUMENTS

| | | | |
|---|---|---|---|
| 5,691,763 A * | 11/1997 | Ichikawa | G01N 21/952 348/125 |
| 6,668,458 B1 | 12/2003 | Schoenleber | |
| 8,600,700 B2 * | 12/2013 | Vogel | G06T 7/73 702/158 |
| 9,876,337 B2 | 1/2018 | Gustavsson | |
| 9,876,338 B2 | 1/2018 | Reversat | |
| 9,881,718 B2 | 1/2018 | Wabnegger | |
| 10,566,771 B2 | 2/2020 | Fenker | |
| 2012/0217018 A1 | 8/2012 | Zediker | |
| 2012/0217019 A1 | 8/2012 | Zediker | |
| 2014/0030903 A1* | 1/2014 | Magno | H02G 15/046 29/863 |
| 2014/0049786 A1* | 2/2014 | Knuepfer | G02B 6/4401 385/101 |

FOREIGN PATENT DOCUMENTS

| | | |
|---|---|---|
| CN | 202856251 | 4/2013 |
| CN | 103986096 | 8/2014 |
| CN | 104008805 | 8/2014 |
| CN | 203786566 | 8/2014 |
| CN | 204012489 | 12/2014 |
| CN | 104392806 | 3/2015 |
| CN | 104625271 | 5/2015 |
| CN | 104635128 | 5/2015 |
| CN | 105067630 | 11/2015 |
| CN | 205016937 | 2/2016 |
| CN | 105551668 | 5/2016 |
| CN | 105743018 | 7/2016 |
| CN | 205616337 | 10/2016 |
| CN | 106340833 | 1/2017 |
| CN | 106348098 | 1/2017 |
| CN | 205950100 | 2/2017 |
| CN | 206095987 | 4/2017 |
| CN | 206461619 | 9/2017 |
| CN | 107331451 | 11/2017 |
| CN | 107809141 | 3/2018 |
| CN | 108110685 | 6/2018 |
| CN | 203871041 | 10/2018 |
| CN | 108839037 | 11/2018 |
| CN | 109187576 | 1/2019 |
| DE | 202015000052 | 3/2016 |
| ES | 2103657 | 9/2017 |
| FR | 2742370 | 6/1997 |
| GB | 2140731 | 12/1984 |
| GB | 2174419 | 11/1986 |
| JP | 11122744 | 4/1999 |
| JP | 2001264032 | 9/2001 |
| RU | 1729208 | 4/1995 |
| RU | 82946 | 5/2009 |
| SE | 201600058 | 5/2016 |
| WO | WO 1997-020236 | 6/1997 |
| WO | WO 2002-103871 | 12/2002 |
| WO | WO 2005-015576 | 2/2005 |
| WO | WO 2011-033539 | 3/2011 |
| WO | WO 2011-155110 | 12/2011 |
| WO | WO 2012-064271 | 5/2012 |
| WO | WO 2013-011230 | 1/2013 |
| WO | WO 2016-080901 | 5/2016 |
| WO | WO 2017-053611 | 3/2017 |

* cited by examiner

CABLE PREPARATION INSPECTION DEVICE, SYSTEM AND METHOD

BACKGROUND

Field of the Invention

The present invention is directed to a device, system and method for inspecting a prepared end of a power cable to analyze and/or verify the adequacy and/or quality of the cable preparation in advance of installation of a cable accessory.

Related Art

Failures in the electrical grid are a major concern for electrical utilities. Failures can result in higher operational cost and, in some cases, prolonged or recurring failures may result in denial of electrical rate increases for the electrical utility or even fines to the electrical utility.

It is generally accepted that most failures in electrical systems tend to occur at the point where an electrical cable has been "modified". Many of these failures have been attributed to improper preparation of the electrical cable to accept an electrical accessory, such as a splice or termination. Proper cable preparation is most often determined by the skill of the installer.

SUMMARY

According to one embodiment of the present invention, a device is provided for analyzing or inspecting a prepared portion of a power cable. The device includes a cable gripping section to grip a portion of the power cable proximate to a prepared end of the power cable, where the cable end has been prepared by removing certain portions of the power cable so that it can properly accept an electrical or cable accessory, such as a splice or termination. The device also includes an imaging device holding section to hold an imaging device at a predetermined radial distance from the prepared cable end. In particular, the imaging device holding section is radially and axially adjustable in position. During inspection of the prepared cable end, the imaging device is fully rotated about the prepared cable end to acquire a 360 degree image of the prepared cable end.

In another embodiment, a method for preparing an end of a power cable comprises removing a first portion of a cable jacket of the power cable, removing a second portion of a cable metallic shield of the power cable, removing a third portion of a semiconductive layer of the power cable, and removing a fourth portion of an insulation layer of the power cable. The method also includes placing a device for analyzing a prepared portion of the power cable onto a portion of the power cable, the device having an imaging device holding section to hold an imaging device at a predetermined radial distance from the prepared cable end. The method also includes rotating the imaging device about the prepared cable end to generate a first image.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to a device for analyzing or inspecting a prepared portion of a power cable. The device includes a cable gripping section to grip a portion of the power cable proximate to a prepared end of the power cable, where the cable end has been prepared by removing certain portions of the power cable so that it can properly accept an electrical or cable accessory, such as a splice or termination. The device also includes an imaging device holding section to hold an imaging device at a predetermined radial distance from the prepared cable end. In particular, the imaging device holding section is radially and axially adjustable in position. During inspection of the prepared cable end, the imaging device is fully rotated about the prepared cable end to acquire a 360 degree image of the prepared cable end. This image can be digitally analyzed, such as by comparing the image to an image of an exemplary prepared cable end. Feedback can be provided to the installer indicating a successful cable preparation operation or if modifications (or another preparation procedure) are required. Thus, the cable inspection device can be used to verify that the electrical cable has been properly prepared to accept an electrical or cable accessory, thereby reducing the likelihood of failures resulting from inadequate cable preparations.

The device and method described herein can leverage computer vision and machine learning technologies to analyze images of cable preparation to provide feedback to the cable preparer/installer on the adequacy or quality of the cable preparation. To this end, the device and method can leverage certain existing mobile device technologies (e.g., cell phones) that are equipped with cameras and CPUs.

Figure 1:
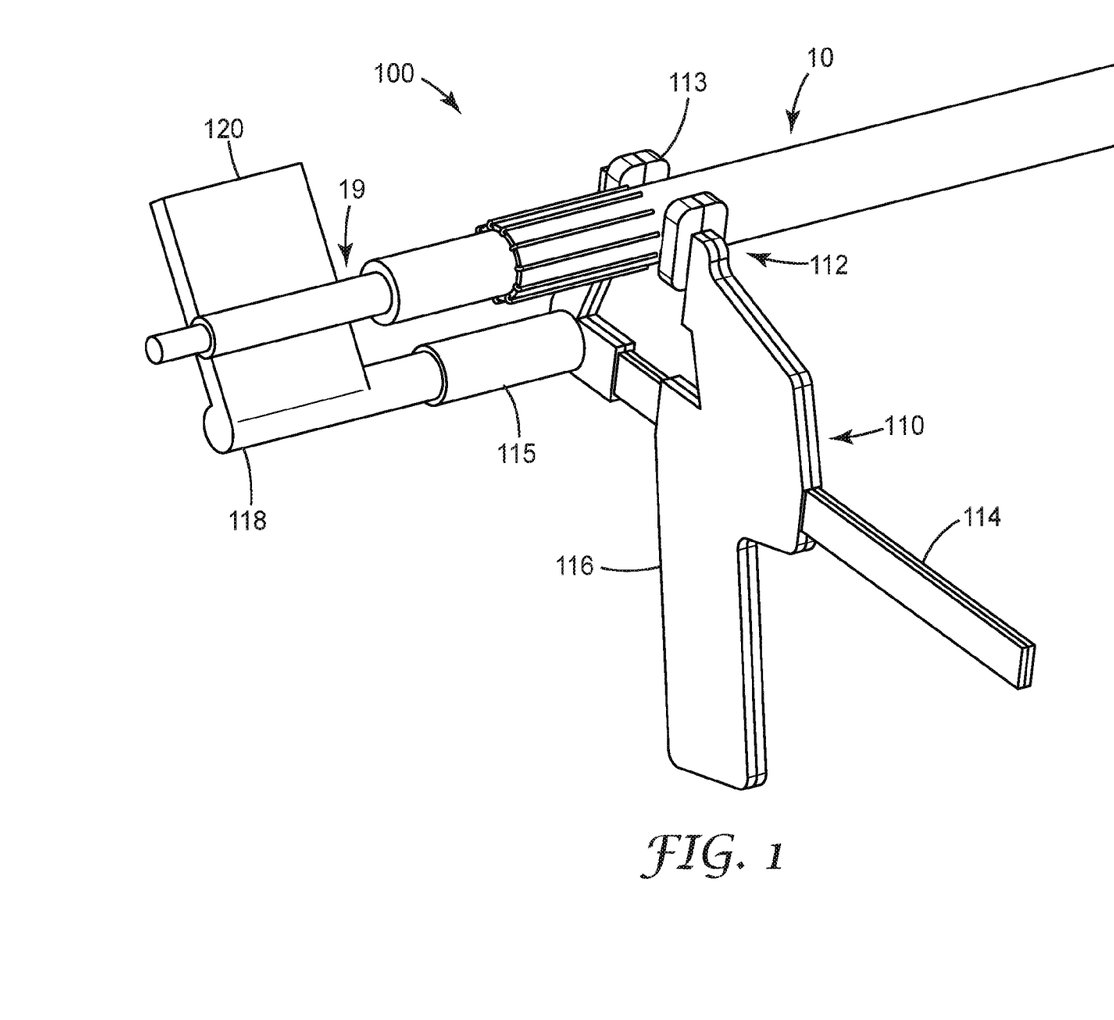
FIG. 1 is an isometric view of a cable end inspection device and system according to embodiments of the invention.

FIG. 1 shows an embodiment of the invention, a cable inspection system 100. The cable inspection system 100 includes a cable inspection device 110 having a general body portion 116. The cable inspection device 110 can be formed from a durable material, such as a metal, plastic, or combination.

The cable inspection device 110 includes a cable gripping section 112 to grip a portion of the power cable 10 proximate to a prepared end 19 of the power cable. The cable gripping section 112 can include a clamp-like feature 113 to firmly grip a portion, such as the jacketed portion, of the power cable 10, which may be a conventional power cable (as described in more detail below) near the prepared end 19 of the power cable. The prepared cable end 19 is generally prepared using a conventional cable end preparation method (described in further detail below). The cable gripping section 112 is adjustable so that different cables or different diameters may be inspected with the device. In an alternative aspect, the cable gripping section 112 can be configured to rotate about the outer surface of cable 10, for example, by including a gripping portion having ball bearings or the like to permit smooth rotation. For example, the cable inspection device 110 can optionally include a handle portion 114.

The cable inspection device 110 also includes an imaging device holding section 118 to hold an imaging device 120 at a predetermined radial distance from the prepared cable end 19. The imaging device holding section can be configured as a cradle or similar structure to releasably hold an imaging device 120, such as a mobile phone 120, tablet, camera, or other imaging apparatus, that is placed on the device 110 and is utilized for cable end inspection, then later removed if necessary. In one aspect, the imaging device 120 can be configured/programmed to take and process images of a prepared cable end to provide immediate feedback to an installer/user. Alternatively, the imaging device can be in communication with a server, processor or service center where image analysis can be performed and the results communicated to the installer/user.

For example, the imaging device 120 can include at least one processor, memory, a communications device, and a graphical user interface. One or more applications or embedded software related to image capture, inspection, and/or analysis of a prepared cable end can be pre-programmed or loaded onto imaging device 120. For example, the application allows the device 120 to record or capture an image of the prepared cable end. The application(s) can also provide for user inputs for cable type/accessory information. The cable type/accessory information can be stored on the device and/or communicated to a data storage location, such as a cloud service, which can access a product database. In addition, the location, date, time, and associated GPS information from the cable preparation site can be entered/stored on the device 120. For example, the global position information of the cable accessory can be provided as GPS coordinates to a utility owner or other interested party.

For example, services can be provided to the user/installer to have the image analyzed by a subject matter expert or by an image analysis tool (which can be stored on the device) for immediate feedback as to the quality of the asset installation. The expert or virtual analysis tool can provide such feedback and indicate if additional cable preparation and/or installation efforts are needed to complete the installation. When installing a cable accessory, such feedback can be related to cable cutbacks (e.g., for cable conductor, insulation, semiconductor layer lengths), crimp depth, crimp number, lug attachment, or other features.

The imaging device holding section 118 can be coupled to the body portion 116 of the cable inspection device 110 via an extension arm 115. In one aspect of the invention, the imaging device holding section 118 can be radially and axially adjustable in position, so that it may take images of the prepared cable end at a predetermined distance for different types of power cables. In an alternative aspect (not shown), the imaging device holding section 118 and/or the extension arm 115 can be rotatably coupled to the main body 116 of the cable inspection device 110 to allow the imaging device to be fully rotatable about the prepared cable end 19 to acquire a 360 degree image of the prepared cable end and/or portions thereof.

Figure 2:
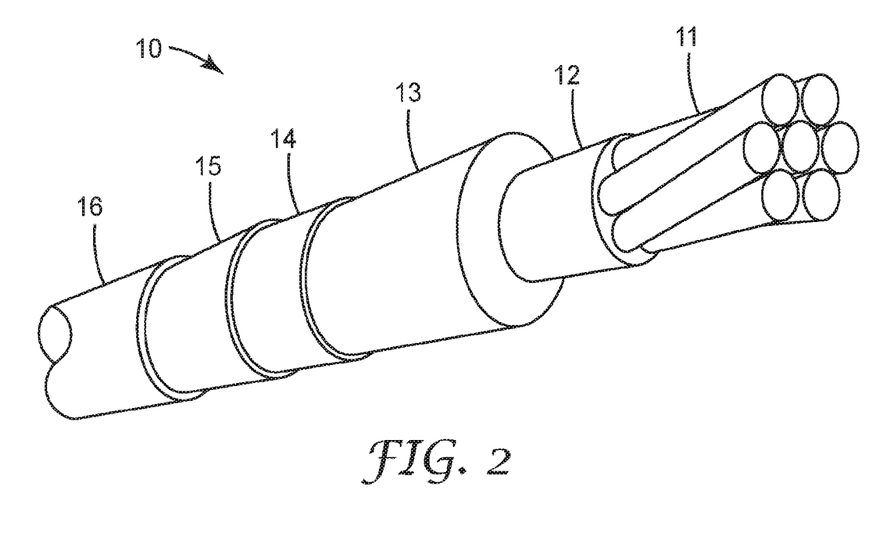
FIG. 2 is a schematic diagram of the layers of a conventional power cable.

Most cable preparation techniques require the user or installer to make multiple cuts on a multi-layer cable, such as exemplary electrical (or power) cable 10 shown in FIG. 2. An electrical cable 10 includes multiple layers such as a conductor 11, a conductor strand shield 12, an insulation layer 13, an insulation shield layer or layers that may include a semiconducting layer 14 and a metallic shield layer 15, and an outer cable jacket 16. Prior to installation of a cable accessory, such as a splice or a termination, these layers need to be removed carefully, to avoid cutting too deeply into the next inner layer, and at the proper axial length. After cutting a particular layer, the user/installer will remove the unwanted material. Often removing the material will require the user/installer to make at least one longitudinal cut along the material so that it can be removed. When this longitudinal cut is performed, the user/installer should ensure that the longitudinal cut is also not too deep, which may damage the next inner layer(s).

Figure 4:
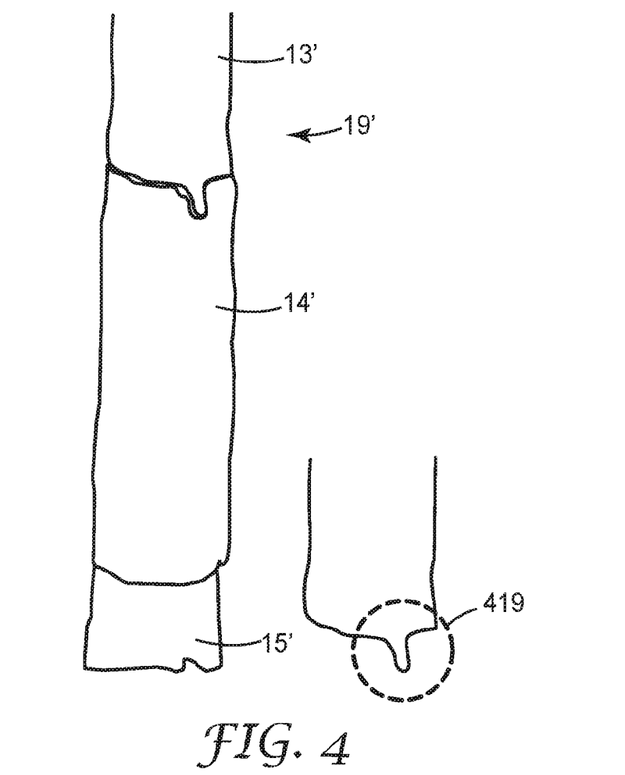
FIG. 4 is a close up schematic view of an image of a prepared cable end defect according to an embodiment of the invention.

In addition, when removing the cut-back material, an important characteristic of an adequate or sufficient quality preparation is that the metallic sheath 15 and the semiconducting layer 14 have a "straight" edge as opposed to a jagged edge that varies in axial distance (see e.g., FIG. 4 for an example of a jagged insulation shielding edge 419', which would correspond to a poorly prepared or insufficient cable end). Without a "clean" cut, points of high electrical stresses are generated. These high electrical stress areas could eventually lead to catastrophic electrical break-down post accessory installation, which could result in an electrical system failure. In addition to creating a "clean" preparation, it is also important that there is sufficient sheathing present to allow the accessory to be properly attached.

According to an aspect of the invention, the cable inspection system and device described above provide a mechanism that can rapidly evaluate how well the cable preparation has been executed and can provide feedback on the types of errors (if any) that are present on the cable end. In addition, this feedback can be used to instruct a user/installer on how to correct for such defects.

Figure 3:
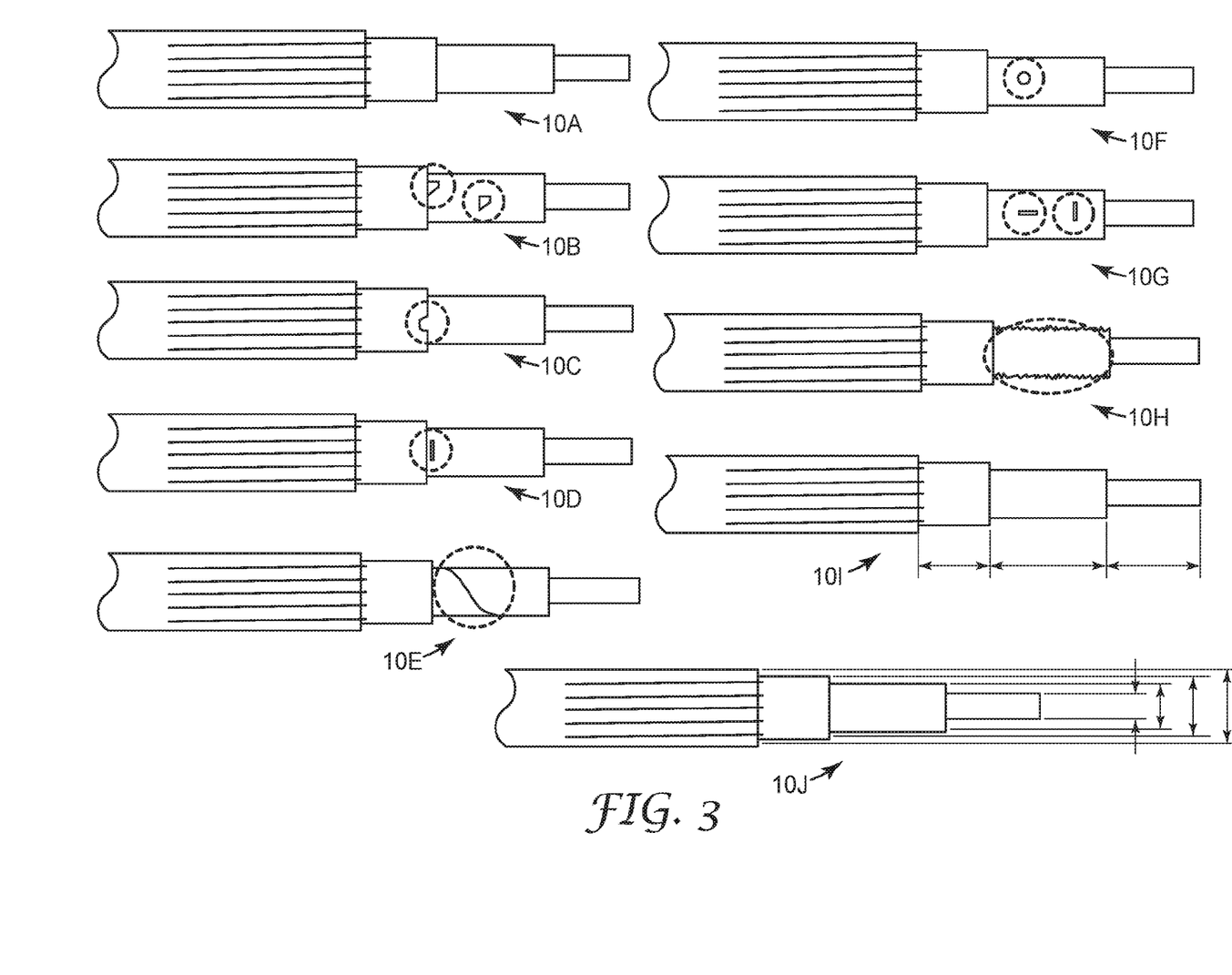
FIG. 3 is a schematic side view of several different types of prepared cable end defects.

For example, FIG. 3 provides a schematic view of several different types of defects that may occur during a cable preparation. For example, these defects (or errors) can include remaining insulation screen (cable 10B); the creation of an insulation screen defect (cable 10C); the presence of an improper insulation surface cut at a transition (cable 10D); the presence of a knife cut or gouge in the insulation layer (longitudinal, spiral, etc.) (cable 10E); a defect in the cable insulation (cut or other) (cable 10F); multiple defects in the cable insulation (cut or other) (cable 10G); a rough insulation layer surface (cable 10H); the axial measured cut-back lengths are incorrect as compared to provided instructions for that particular cable and accessory (cable 10I); the cable section diameters are incorrect as compared to provided instructions for that particular cable and accessory (cable 10J); and there is missing or incomplete coverage of a particular surface with a provided compound (cable 10K). As a comparison, cable 10A shows a defect-free prepared cable end. In one aspect, the cable inspection system and device described herein can identify such cable preparation defects prior to installation of a cable accessory, allowing the user/installer to repair the prepared cable end or repeat the process to create an acceptable prepared cable end.

FIG. 4 shows an example of an image enhanced prepared cable end 19'. In this example, the insulation 13', semiconducting shielding layer 14' and metallic shield layer 15' are shown. In particular, a jagged insulation shielding edge region 419' is shown, where the edge of the semiconductive shielding layer 14' has a variable edge, where the axial measured cut-back length is inconsistent and thus would likely provide insufficient shielding within an installed cable accessory.

Figure 5:
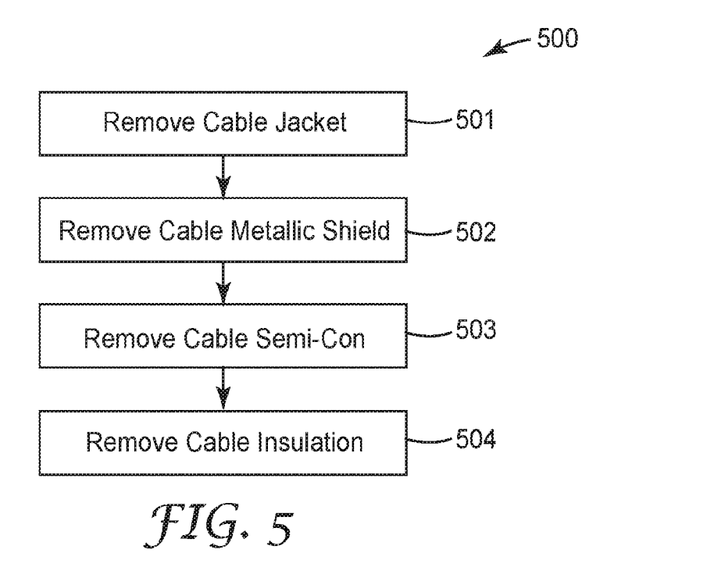
FIG. 5 is a flow diagram of a typical cable end preparation method.

An example cable preparation process 500 is summarized in FIG. 5. For example, depending on the cable and accessory type, after the end of the cable is square cut in accordance with standard cable cutting techniques (and utilizing conventional cable cutting tools), a portion of the cable jacket can be removed to the correct cut-back length from the cable end in step 501. In step 502, a portion of the cable metallic shield can be removed to the correct cut-back length. In step 503, a portion of the semiconductive shield layer is removed. And, in step 504, a portion of the cable insulation can be removed to expose a certain length of the cable conductor.

In addition to the cable inspection system and device described herein, in another aspect of the invention, a method for preparing an end of a power cable, such as cable 10, is provided. As noted above, several portions of the cable construction are removed in accordance with a preparation procedure established for a particular voltage, cable type and accessory. Next, the cable inspection device can be placed onto a portion of the prepared cable, such as is shown in FIG. 1. The user/installer can then place the imaging device holding section (with a mounted imaging device) at a predetermined radial distance from the prepared cable end and/or at a particular axial location to inspect the prepared cable end. The imaging device holding section can then be rotated about the prepared cable end to generate a first image. This first image can then be processed on the imaging device or communicated to a server/processor/service/app.

For example, in one example inspection procedure, at the completion of the cable insulation layer removal, an image of the prepared cable is digitally captured by imaging device 120, which can be a stand-alone camera, mobile phone camera, or other imaging device to capture 360-degree view of the prepared cable end region. The captured image can be analyzed (e.g., by a pre-loaded application or app stored on the imaging device or by a remote server or processor) to identify frequency and types of defects resulting from the cable preparation method. To assess preparation quality, in one aspect, the first image can be compared to a second image, where the second image is provided from a database of images. Further comparisons can be made by the program/service and a result can be generated indicating sufficient or insufficient preparation quality.

Figure 6:
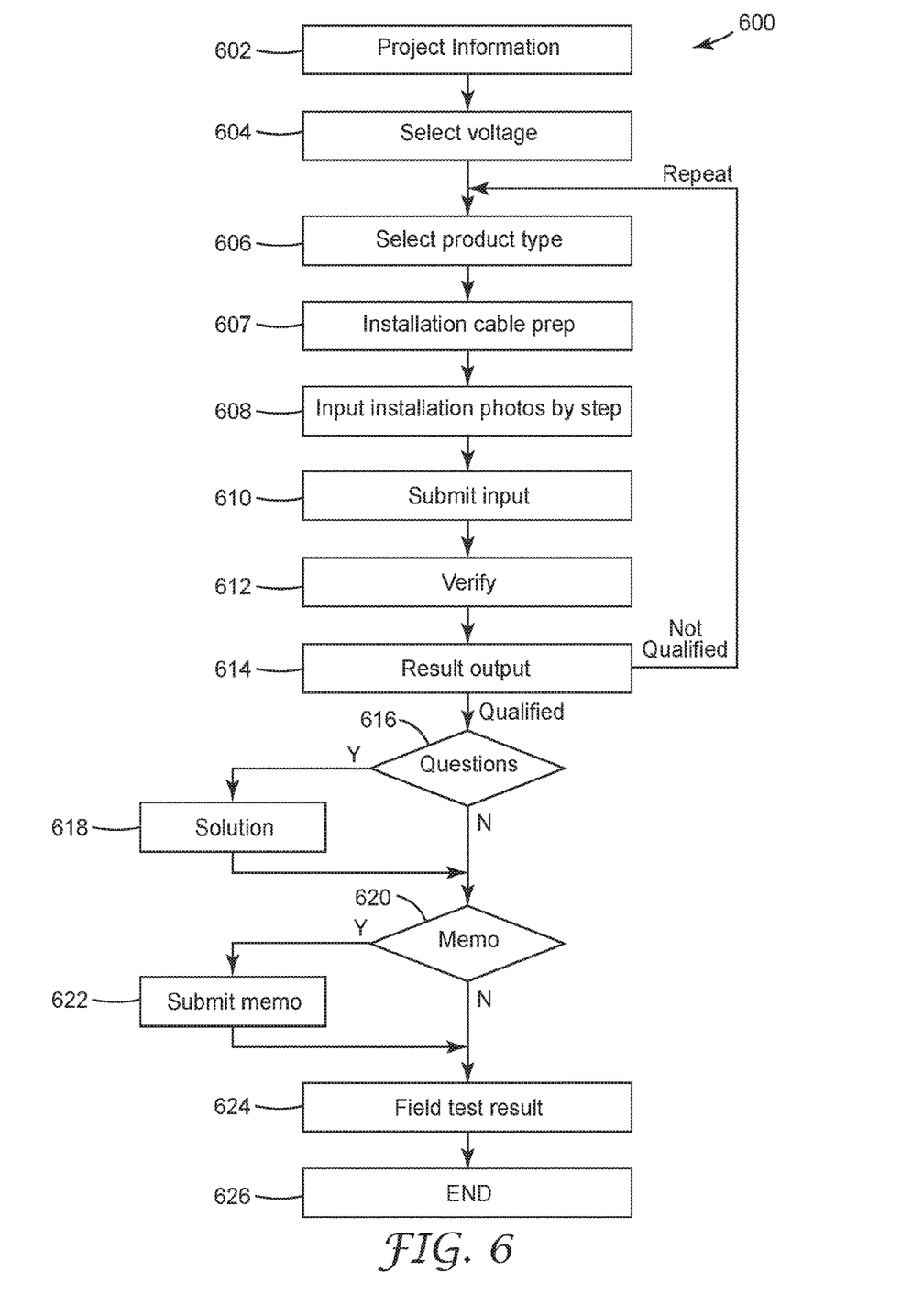
FIG. 6 is a flow diagram of an installation of a medium voltage cable splice according to an embodiment of the invention.

The results of this analysis can be communicated/provided to the cable user/installer to let the user/installer know that the overall work was sufficient or insufficient. FIG. 6 provides a flow chart of an example preparation/feedback process.

To identify when a portion of the shielding or sheathing may have been mis-prepared, the cable inspection system can, for example, measure the tangent to each point between each of the layers (e.g., at insulation shielding edge region 419' shown in FIG. 4). If the shielding edge is a clean cut, the change in the angle from one pixel to the next should remain constant (it is on an elliptical curve). However, if there is material missing, the change in the tangent will vary significantly as one moves across the intersecting edge.

If an imaging device captures a 360-degree view of the prepared cable, the user feedback can include information related to cut back lengths, cut angles, and information on layer smoothness, including cuts or other irregularities in a layer.

FIG. 6 provides image analysis and verification process flows for medium voltage (MV) & taped splice accessory installation.

In FIG. 6, project information is gathered in step 602, such as the cable type being prepared and the accessory type being installed. Project information can also include the project name, the customer name, the project location, the installation date, and the installation conditions (e.g., weather conditions, etc.). This information can be entered and stored on the application for future reference by the customer, accessory provider and/or installer.

In step 604, the operating voltage for the MV splice is selected. For medium voltage installations, voltage levels such as 10 KV, 20 KV, 33 KV, and 35 KV can be utilized. This information can be entered into and stored in the app.

In step 606, the cable accessory is selected. For example, accessory information for an accessory such as a splice, termination, T-body, or GIS can be entered into and stored in the app, such that the proper associated database can be accessed.

In step 607, the cable is prepared in accordance with the type of cable, voltage level and cable accessory being installed.

In step 608, a full 360 degree image of the prepared cable end (or portion thereof) is taken by the cable inspection system, such as the system and device described herein. In this step, an image of the cable end can be captured at each step, e.g., jacket removal, metallic shield removal, etc, prior to the installation of the cable accessory.

In step 610, the image data is submitted to (for later processing by) the cloud-based server/off-site service.

In step 612, the image data is verified.

In step 614, the processed/verified data is output to the user/installer. If the processed/verified data indicates that the preparation is insufficient, the selection/preparation steps are repeated.

In step 616, if the processed/verified data indicates that the preparation is not sufficient, questions are evaluated to determine what, if any, repairs may be needed to meet requirements.

In step 618, a solution is provided. In other words, if the query is yes, then there are ways to fix the problems indicated by the processed/verified data.

In step 620, if the query yields "no," a memo is prepared. The memo is provided to the customer or installer/accessory provider so that additional information can be entered into the app. For example, if the cable has a minor defect, a request can be made to replace the cable. If this request is not accepted (i.e., the cable is not replaced), the customer can take responsibility if the accessory later fails due to the defect.

In step 622, the memo is submitted and stored on the app and/or the cloud-based service/database.

In step 624, the customer/installer can perform a field test to verify whether the accessory installation meets requirements.

In step 626, the process is complete.

In an alternative embodiment, such as for high voltage (HV) cable accessory installations, additional steps can be performed. For example, certain HV installations can be more complicated than MV installations, so an additional step may include contacting a quality engineer for feedback during one or more of the installation steps to verify proper installation.

Thus, the cable inspection device and system can be utilized with the above process to reduce the likelihood of cable accessories being installed on poorly prepared cables.

In further alternative aspects, using computer vision allows the system to identify the different layers of the prepared cable. For high-voltage cables, there can be a significant color difference between the different layers of the cable. Using these color differences, each pixel in the captured image as can be assigned a higher contrast color for that particular layer, e.g., "background", "conductor", "insulating layer", "semi-conducting shield layer" and "metallic shielding," etc. By providing a higher contrast color scheme, defects can be more easily identified by the program or by the installer/user.

The cable inspection program/app can also include a comparison algorithm to judge whether the cable preparation work is acceptable or not. For example, over time, a library of different acceptable/unacceptable cable images can be accumulated.

Overall, the device and method described herein can provide real time feedback to verify that the electrical cable has been properly prepared to accept an electrical or cable accessory, thereby reducing the likelihood of failures resulting from inadequate cable preparation.

Various modifications, equivalent processes, as well as numerous structures to which the present invention may be applicable will be readily apparent to those of skill in the art to which the present invention is directed upon review of the present specification.

We claim:

1. A device for inspecting a prepared portion of a power cable, comprising:
    a cable gripping section to grip a portion of the power cable proximate to a prepared end of the power cable, and
    an imaging device holding section to hold an imaging device at a predetermined radial distance from the prepared cable end,
    wherein the imaging device holding section is radially and axially adjustable in position,
    and wherein during inspection of the prepared cable end, the imaging device is fully rotated about the prepared cable end to acquire a 360 degree image of the prepared cable end.

2. The device of claim 1, wherein the cable gripping section rotatably grips the portion of the power cable proximate to the prepared end of the power cable.

3. The device of claim 1, wherein the imaging holding section is coupled to an extension arm that rotates about the prepared cable end.

4. A system for inspecting a prepared portion of a power cable, comprising:
    a cable inspection device that includes cable gripping section to grip a portion of the power cable proximate to a prepared end of the power cable, and
    an imaging device mounted to an imaging device holding section of the cable inspection device to hold the imaging device at a predetermined radial distance from the prepared cable end,
    wherein the imaging device holding section is radially and axially adjustable in position,
    and wherein during inspection of the prepared cable end, the imaging device is fully rotated about the prepared cable end to acquire a 360 degree image of the prepared cable end.

5. The system of claim 4, wherein the cable gripping section rotatably grips the portion of the power cable proximate to the prepared end of the power cable.

6. The system of claim 4, wherein the imaging holding section is coupled to an extension arm that rotates about the prepared cable end.

* * * * *

UNITED STATES PATENT AND TRADEMARK OFFICE
CERTIFICATE OF CORRECTION

PATENT NO. : 12,198,326 B2
APPLICATION NO. : 17/593977
DATED : January 14, 2025
INVENTOR(S) : Cecil Venantious Francis et al.

It is certified that error appears in the above-identified patent and that said Letters Patent is hereby corrected as shown below:

In the Claims

Column 8
Line 20-21, In Claim 3, delete "imaging holding section" and insert -- imaging device holding section --, therefor.
Line 41-42, In Claim 6, delete "imaging holding section" and insert -- imaging device holding section --, therefor.

Signed and Sealed this
Twenty-second Day of July, 2025

Coke Morgan Stewart
*Acting Director of the United States Patent and Trademark Office*